United States Patent [19]
Barlow

[11] 3,938,084
[45] Feb. 10, 1976

[54] ERROR DETECTION APPARATUS FOR VERIFYING BINARY CODED CONSTANTS

[75] Inventor: George J. Barlow, Tewksbury, Mass.

[73] Assignee: Honeywell Information Systems, Inc., Waltham, Mass.

[22] Filed: Dec. 24, 1974

[21] Appl. No.: 536,127

[52] U.S. Cl. ...... 340/146.1 AB; 235/153 A; 360/31
[51] Int. Cl.[2] .................. H03K 13/34; G11B 27/36
[58] Field of Search ....... 235/153 A; 340/146.1 AB, 340/146.1 AY; 360/31; 445/1

[56] References Cited
FOREIGN PATENTS OR APPLICATIONS
1,926,502  5/1969  Germany ................... 340/146.1 AB Primary Examiner—R. Stephen Dildine, Jr.
Attorney, Agent, or Firm—Faith F. Driscoll; Ronald T. Reiling

[57] ABSTRACT

A peripheral subsystem includes error detection apparatus for verifying whether "speed constants" applied thereto have been decoded properly and contain legal codes. The detection apparatus includes binary to decimal decoder circuits which receive the binary coded speed constants and generate a predetermined output signal on one of a plurality of output terminals of the decoder circuits. A selected number of output terminals of the binary to decimal decoder circuits which are less than one half of the total output terminals are applied as inputs to an odd-even check circuit. When each of the constants are decoded without error and contain a legal code, the decoder circuits provide signals to the check circuit which produce a predetermined check signal to indicate that the constant has been decoded properly by the decoder circuits and contains a legal code.

20 Claims, 2 Drawing Figures

ERROR DETECTION APPARATUS FOR VERIFYING BINARY CODED CONSTANTS

BACKGROUND OF THE INVENTION

1. Field of Use

This invention relates to detection apparatus and more particularly to apparatus capable of verifying the correctness of binary coded information.

2. Prior Art

It is well known to provide duplicate circuits together with compare circuits for duplicating the performance of a given operation and comparing both results in order to determine whether the operation was performed properly. It has been found that this type of checking arrangement is extremely costly. More importantly, such arrangements are not usually able to detect whether the particular code being checked is a "valid" or "legal" code.

The prior art has also provided arrangements for detecting errors produced by hardware failures occurring in a decoder circuit. While such arrangements reduces the redundancy of circuits required for performing verification, they also reduce the circuits capability of verifying the correctness of the binary coded signals. More importantly, arrangements of these types are also not normally able to detect whether the code is a valid code.

Accordingly, it is an object of the present invention to provide improved error detecting apparatus which utilizes a minimum of circuits for verifying the correctness of binary coded information signals.

It is a further object of the present invention to provide error detecting apparatus which also verifies the correctness of the code in addition to detecting the occurrence of hardware failures in the detection apparatus.

SUMMARY OF THE INVENTION

These objects are achieved in a preferred embodiment of the present invention which includes error detection apparatus which operates in conjunction with a peripheral subsystem. The apparatus includes binary to decimal decoder circuits which receive the binary coded signals corresponding to speed constants to be verified. Only selected output terminals of the binary to decimal decoder circuits which correspond to valid or legal codes are applied as inputs to an odd-even check circuit. The odd-even check circuit generates odd and even check signals indicative of an error in response to the coded signals applied from the decoder circuits.

In the preferred embodiment, the number of codes to be verified correspond to an odd number, therefore, the check circuit provides an odd check signal indicative of an error. Since substantially all faults in the binary decoder circuit result in the generation of an odd parity signal, the output signal produced by the odd-even check circuit also verifies the operation of the decoder circuits. More importantly, the apparatus signals when an invalid code has been applied to the decoder circuits. Additionally, since only the used output terminals of the decoder circuits are checked by the odd-even check circuit, the detection apparatus ignores automatically errors or faults involving unused codes. Therefore, operation of the subsystem is only interrupted when the constant being verified could affect such operation.

The above and other objects of this invention are achieved in the preferred embodiment disclosed hereinafter. Novel features which are believed to be characteristic of the invention both as to its organization and method of operation, together with further objects and advantages will be better understood from the following description when considered in connection with the accompanying drawings. It is to be expressly understood that the drawings are for the purpose of illustration and description only and are not intended as a definition of the limits of the present invention.

DESCRIPTION OF THE PREFERRED EMBODIMENT

Figure 1:
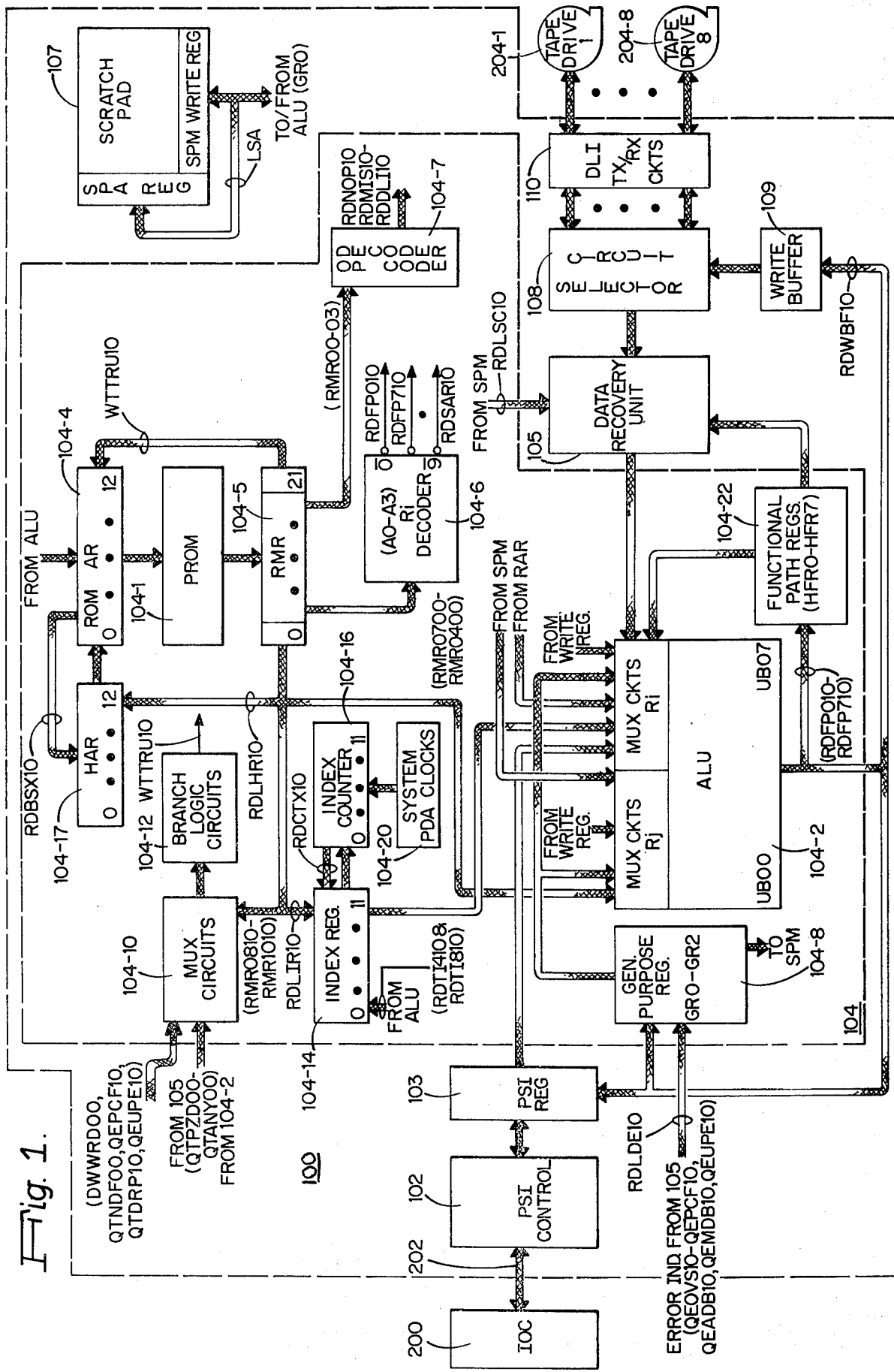
FIG. 1 shows in block diagram form a peripheral subsystem which utilizes the error detection apparatus of the present invention.

Referring first to FIG. 1, there is shown a peripheral subsystem which utilizes the principles of the present invention. More particularly, as shown, the peripheral subsystem couples to an input/output controller (IOC) 200 and to a data processing system, not shown. Additionally, the peripheral subsystem includes one or more peripheral devices. In the figure shown, the peripheral devices correspond to magnetic tape drive devices 204-1 through 204-8 for recording and reading blocks of data.

As shown, the peripheral subsystem includes a peripheral processor or controller 100 for performing the necessary operations for transferring data between any one of the magnetic tape drive 204 devices and the IOC 200. The controller includes a microprogrammed processing unit 104 which in response to commands received from the IOC executes microinstructions stored in a control store 104-1 necessary to perform the operations specified by the command. In addition to microinstructions, the control store 104-1 contains other information in the form of constants which are required to be transferred to the peripheral devices or to the IOC 200 enabling proper execution of the commands.

More particularly, response to command code bytes received from the IOC 200, applied via the PSI control 102, PSI register 103 and an arithmetic and logic unit (ALU) 104-2, the processing unit 104 causes microinstructions to be read out into a memory register 104-5 and decoded by decoder circuits 104-6 and 104-7. The decoder circuits generate the various control signals which condition the other portions of the controller 100 to perform operations necessary for executing the type of command specified.

Additionally, as seen from FIG. 1, signals from the memory register 104-5 are also applied to multiplexer circuits 104-10, conventional in design, which additionally receive control and status signals from other portions of the system such as the data recovery unit 105, for testing the results or progress of the particular operation. Actual testing is accomplished by the branch logic circuits 104-12 which can be considered conventional in design. Also, signals representative of addresses contained within various types of microinstructions are applied from register 104-5 to a further pair of registers 104-14 and 104-16. The register 104-14 an index register which is loaded via register 104-5 in response to a subcommand signal RDLIR10 or via the ALU 104-2 in response to subcommand signal RDT1410. The register 104-14 couples to an index counter 104-16 and is used to provide the required timing strobe signals necessary for writing or reading information characters to and from the write buffer 109 and the data recovery unit 105 respectively. The index counter 104-16 is decremented in response to PDA clocking signals generated by multifrequency system clock circuits 104-20. For the purpose of the present invention, these circuits can be considered conventional in design.

The register 104-17 is used as a history address register which allows proper sequencing through microinstructions stored in memory 104-1. For example, the history register 104-17 is operative to store a return branch address from the memory local register 104-5 until such time that the address is to be transferred to the read only memory address register 104-4. This address when transferred causes the register 104-4 to condition the memory 104-1 to select again a previous location within the memory allowing the continuance of a particular operation.

As seen from FIG. 1, the ALU 104-2 receives and delivers signals to the registers shown. The signals which are to be applied as operand inputs to the ALU 104-2 are selected via multiplexer circuits included therein. The ALU 104-2 and multiplexer circuits can be considered conventional in design and may for example take the form of circuits disclosed in a text titled "The Integrated Circuits Catalog for Design Engineers", published by Texas Instruments, Inc., dated 1972.

The ALU 104-2 is connected to provide output signals to a plurality of functional path registers 104-22 which are used for control purposes such as for providing control signals to the data recovery unit 105 and storing hardware error conditions as explained herein. Each bit in each of the individual registers is used to indicate or to initiate a specific event or operation. The contents of these registers are examined by the microprogram processing unit 104 via branch circuits in order to ascertain the state of the controller during an operation as well as being used for internal timing and for enabling the execution of commands.

Additionally, the ALU 104-2 is also connected to transmit and receive signals to and from a plurality of general register 104-8 (i.e. registers GR0 through GR2) which are used for storage of certain record processing information. More specifically, register GR0 is used to control the transfer of input and output data signals to and from a scratch pad memory 107. Hence, it serves as a memory local register for scratch pad memory 107. Register GR1 serves as an input buffer register for the scratch pad memory 107. Also, register GR2, similar to register GR0, provides temporary storage of information to be stored in the scratch pad memory 107.

The scratch pad memory 107 provides temporary storage for data, various control information and parameters required for executing read and write operations. As seen from FIG. 1 and mentioned above, both address and data are transmitted to and from the scratch pad memory 107 via the ALU 104-2 and general registers. The scratch pad memory 107 is of solid state construction and has 512 storage locations each containing 10 bit positions. The first 32 storage locations serve as a data buffer when the controller 100 is operating in a data mode (i.e. transferring or receiving data characters of a record). When in this mode, addressing of the scratch pad memory 107 takes place via a pair of address counters, write and read counters not shown. The contents of the read address counter are used to read out information from the locations of the scratch pad memory while the contents of the write address counter are used to write information into the scratch pad memory. For the purposes of the present invention, the operation of these counters for addressing the scratch pad memory 107 can be considered conventional in design.

The remaining storage locations of the scratch pad memory 107 are used for storage of device constants, control parameters for control of the controller and associated tape drive devices. Additionally, the scratch pad memory 107 can be addressed by a scratch pad address register which receives information from the ALU 104-2 and the register is used when either control constants and parameters are to be sent to portions of the controller 100 or used for updating certain status information previously stored in scratch pad memory 107.

In the preferred embodiment of the present invention, it is the selected peripheral device which upon being polled by the processing unit 104 provides a code indication of the devices operating speed (e.g. the speed of the magnetic tape device). This information is referred to as the "speed constant" of the device and is stored in scratch pad memory 107. The "speed constant" is transferred to an input register of the data recovery unit 105 as described herein and is used to condition data recovery clock circuits to respond to input data signals at the appropriate transfer rate.

From the speed constant and density information included within a "set function mask" command, the processing unit 104 determines the rate at which data bytes are to be written into or read from the selected device. This determination is made by combining in some arithmetic or logic fashion, the speed constant and density information to obtain an address which is loaded into the read only memory address register 104-17 for addressing the read only memory 104-1 which stores information defining the read/write rate for the selected device. This information, referred to as the "read/write pulse constant," is read out from the read only memory 104-1 by the processing unit 104 and to the index register 104-14. During a data transfer, this information is loaded into index counter 104-16 as well as being applied to the data recovery unit 105 to define the time intervals during which strobe signals are generated which signal transfer of data bytes. Thus, these signals establish the rates at which data is transferred by the control 100 between a selected tape device and the IOC 200. For further information regarding the manner in which this information is obtained and utilized in the system of FIG. 1, reference may be made to the copending patent application title "Method and Apparatus for Dynamically Controlling Read/Write Operations in a Peripheral Subsystem" invented by S. Patel bearing U.S. Ser. No. 430,837 which is assigned to the same assignee as named herein.

Figure 2:
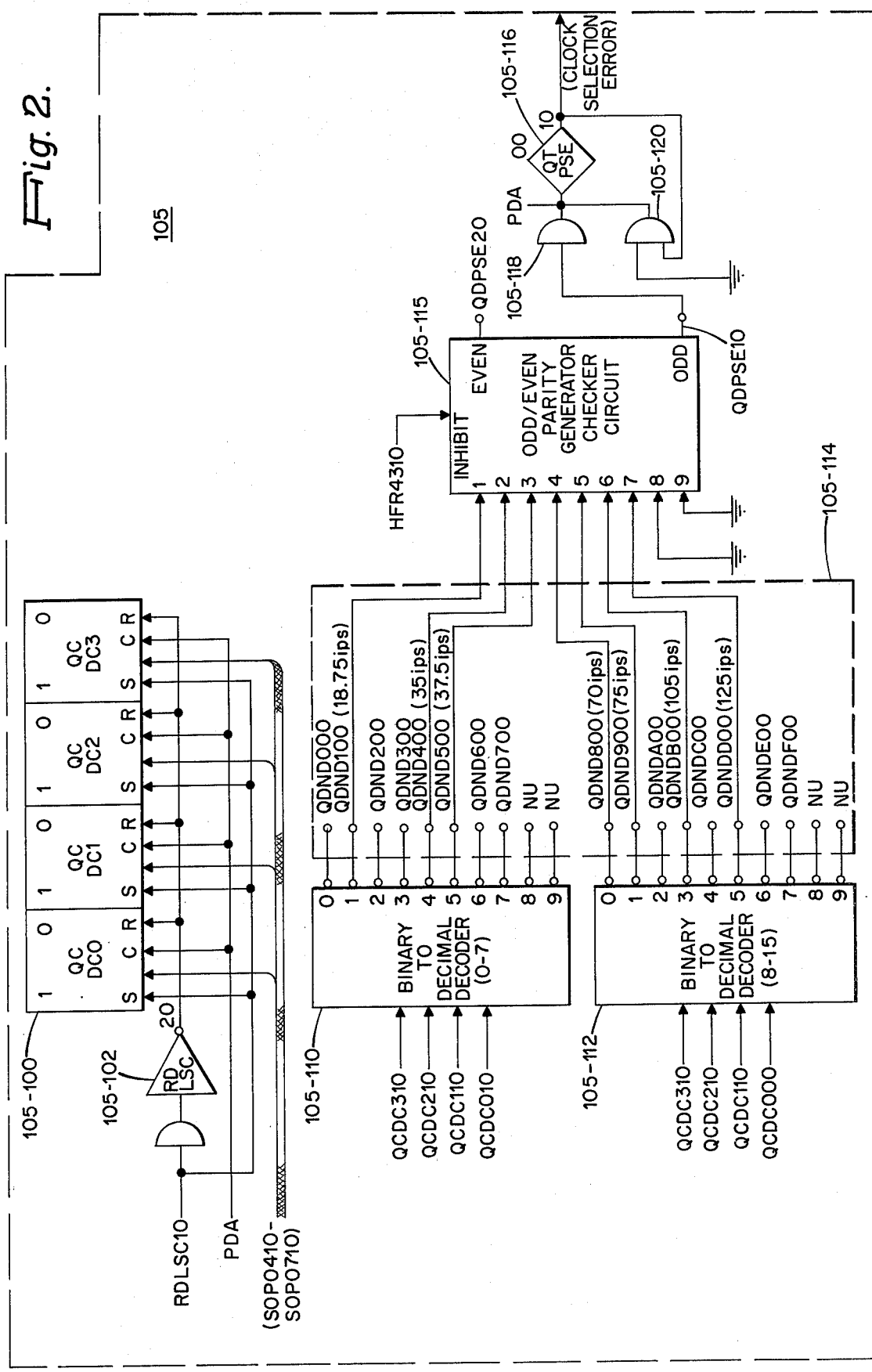
FIG. 2 shows the error detection apparatus of the present invention.

From the above, it is seen that it is very important for the processing unit 104 to verify that a "valid" speed constant has been selected since the constant determines whether the device selected is a "legal" device. The apparatus shown in FIG. 2 is used to verify the constant. The detection apparatus of FIG. 2 is included within the data recovery unit 105. This apparatus is used to accomplish this verification and provide an indication when the constant is incorrect.

Error Detection Apparatus — FIG. 2

Referring now to FIG. 2, it is seen that the detection apparatus of the present invention includes an input register 105-100 operative to receive the binary coded signals SOPO410 through SOPO710 as shown. These signals are loaded into register 105-100 in response to the subcommand signal RDLSC10 upon the occurrence of a PDA clock pulse applied to each of the clock inputs of the four flip-flops which comprise register 105-100. As seen from the figure, register 105-100 is reset via a gate and inverter circuit 105-102 prior to loading the register flip-flops.

The binary ONE outputs of each of the four flip-flops are applied as an input to a first binary to decimal decoder circuit 105-110. The binary ZERO output of the first flip-flop and the binary ONE outputs of each of the remaining register flip-flops are applied as inputs to a second binary to decimal decoder circuit 105-112 as shown. Each decoder circuit can be considered conventional in design and make take the form of circuits disclosed in the previously referenced publication titled "The Integrated Circuits Catalog for Design Engineers". More specifically, each decoder circuit may employ circuits designated as SN7442 manufactured by Texas Instruments, Inc.

As seen from FIG. 2, a first group of binary coded signals are decoded by circuit 105-110 while the second group of binary coded signals are decoded by circuit 105-112. By taking the binary ZERO output of the first flip-flop (i.e. signal QCDC000), those input binary coded signals having values greater than 7 are decoded (i.e. output terminals 8 and 9 of decoder circuit 105-110 are not used).

It is seen that only selected ones of the output terminals of each of the binary decimal decoder circuits 105-110 and 105-112 are connected to an odd-even parity generator checker circuit 105-115 which includes an even and odd output terminals. In the preferred embodiment, these connections are etched on a substrate 105-114. This is illustrated diagrammatically in FIG. 2.

A different one of the signals QDND100, QDND400, QDND500, QDND800, QDND900, QDNDB00, and QDNDD00 is forced to binary ZERO when a binary code representative of valid or legal speed is applied as an input to one of the decoder circuits 105-110 and 105-112. The codes for the various speeds are as indicated. More specifically, signal QDND100 is forced to a binary ZERO when a speed constant binary code of "0001" is applied to decoder circuit 105-110. Similarly, signals QDND400, QDND500, QDND800, and QDND900 are forced to binary ZEROS when codes of 4 through 9 respectively (i.e. codes of 0100 through 1001) are applied to the decoder circuits 105-110 and 105-112. Signals QDNDB00 and QDNDD00 are forced to binary ZEROS when codes of 11 and 13 respectively (i.e. codes of 1011 and 1101 are applied to decoder circuit 105-112.

From the foregoing, it is seen that only eight of the possible ten decoded output signals from each of the decoder circuits 105-110 and 105-112 are required because four bit binary speed constant code provides only sixteen possible decodes. More importantly, it will be noted that only less than fifty percent of the possible decode output signals are applied as inputs to the parity generator checker circuit 105-115. That is, only seven speed constants define "legal" or "valid" codes and only these decoder outputs are checked by the circuit 105-115. By checking only the codes being used, the detection apparatus reduces the number of circuits required.

Because only seven of the nine possible inputs of the checker circuit 105-115 are used, two of the inputs to the parity circuit 105-115 are connected to ground. Thus, when incorrect code signals are applied to the decoder circuits, all seven of the used output terminals of the decoder circuits will be binary ONES. This means that an odd number (i.e. seven) of binary ONES are applied to the checker circuit 105-115. Thus, the parity circuit 105-115 is arranged to generate a binary ONE at its odd output terminal only upon detecting an error condition. When one and only one of the decoder outputs is forced to a binary ZERO as is the case for a legal or correct code, this conditions the parity circuit 105-115 to produce a binary ONE at its even output terminal indicative of a no error condition.

It will be appreciated that in the case where there were only six valid speed constants only six signals would be applied to the parity circuit 105-115. This would reverse the significance of the signals produced at the odd and even output terminals. That is, when the parity circuit 105-115 produced a binary ONE at its terminal, this would signal an error condition. When the parity circuit 105-115 forces its odd output terminal to a binary ONE that indicates the occurrence of no error condition.

In the preferred embodiment of the present invention, the parity generator checker circuit 105-115 may be considered conventional in design. For example, the circuit may include a plurality of gates which are arranged to perform exclusive OR operation upon the input signals applied thereto and generate a signal indicative of the result. Also, the parity circuit may be implemented utilizing circuits designated S8260 manufactured by Signetics, Inc. It will be seen that an inhibit input is also applied to the parity check circuit 105-115. This signal when forced to a binary ONE inhibits the operation of the circuit. In the preferred embodiment, this signal corresponds to a mode signal derived from one of the flip-flops of functional path register HF4 of block 104-22 in FIG. 1.

The odd output terminal of parity circuit 105-115 is applied to set gate 105-118 of a flip-flop 105-116. The binary ONE signal is operative to switch the flip-flop 105-116 to a binary ONE signalling the occurrence a clock selection error condition. The flip-flop is reset a clock pulse later via a reset AND gate 105-120 connected as shown only after signal QDPSE10 switches to a binary zero.

DESCRIPTION OF OPERATION

With reference to FIGS. 1 and 2, the operation of the error detection apparatus will now be described. It is assumed by way of example that a speed binary constant code of "0001" representative of a speed of 18.75 inches per second (ips) is accessed from scratch pad memory 107 and loaded into input register 105-110 in response to signal RDLSC10 being forced to a binary ONE. The binary code bits of the constant are in turn applied to each of the decoder circuits 105-110 and 105-112. The code "0001" when decoded by circuit 105-110 normally forces signal QDND100 from a binary ONE to a binary ZERO. This in turn results in an even number of binary ONE signals being applied to parity check circuit 105-115 provided that none of the other decoder output terminals have been forced to binary ZEROS. In the absence of any fault condition in the decoder circuits, no other signals are forced to binary ZEROS. Thus, the parity circuit 105-115 is operative to force its even output terminal to a binary ONE and force its odd output terminal to a binary ZERO. Thus, signal QDPSE10 is a binary ZERO and flip-flop 105-116 is in a binary ZERO state.

It will be appreciated that where a fault condition prevents decoder circuit 105-110 from forcing signal QDND100 to a binary ZERO, parity circuit 105-115 forces its even output terminal to a binary ZERO and its odd output terminal to a binary ONE signalling the occurrence of an error. Thus, signal QDPSE10 is a binary ONE which switches flip-flop 105-116 to a binary ONE indicating the error condition. In this case, the error is signalled because of the occurrence of a fault condition. It will be appreciated that the present invention takes advantage of the fact that most failure conditions will prevent the decoder circuits from producing an output signal resulting in an error condition.

The detection apparatus also will signal an error in the event of a multiple failure. For example, where the application of the code "0001" causes the decoder circuits to force two output terminals to binary ZEROS, this causes an even number of binary ONES to be applied to parity check circuit 105-115. Accordingly, the check circuit 105-115 is then operative to force its odd output terminal to a binary ONE resulting in flip-flop 105-116 switching to a binary ONE signalling the error condition.

When an illegal code is applied to the binary decoder circuits 105-110 and 105-112, this results in none of the output terminals which connect to the check circuit 105-115 to be forced to binary ZEROS. This results in an odd number of binary ONES to be applied to the parity check circuit 105-115 which again forces odd output terminal to a binary ONE signalling of an error condition. Where the occurrence of single or multiple fault also causes the selection of an unused output or illegal speed, such category of faults are automatically ignored by the error detection apparatus. That is, only multiple errors involving utilized output signals are signalled. Thus, the controller operation continues in such cases and is only interrupted when the error detection apparatus senses illegal codes or failures relating to "valid" codes.

From the foregoing description, it is seen that the error detection apparatus of the present invention provides for efficient sensing of illegal codes and detection of faults occurring within the error detection apparatus. It is able to perform such functions reliably utilizing a minimum of apparatus. Moreover, by arranging to detect errors in a limited number of "valid" codes corresponding to less than 50 percent of the total number of possible legal or valid codes, the apparatus minimizes the number of circuits increasing its reliability. Additionally, the error detection apparatus of the present invention is arranged to ignore automatically a category of fault conditions which will not interfere with normal operation. Thus, the arrangement provides for signalling error conditions to the controller of the peripheral subsystem only where the speed code being utilized could affect system operation.

It will occur to those skilled in the art that many changes may be made to the preferred embodiment of the present invention without departing from its scope. For example, a single decoder circuit which provides an hexadecimal output could be used in place of the two decoder circuits of the preferred embodiment. Also, different implementations of the decoder circuits and parity check circuits may also be employed.

While in accordance with the provision and statutes, there has been illustrated and described the best form of the invention and, certain changes as mentioned may be made in the apparatus and system described without departing from the scope of the invention as set forth in the appended claims and that in some cases, certain features of the invention may be used to advantage without a corresponding use of other features.

What is claimed is:

1. Error detection apparatus for verifying the correctness of a binary coded constant, said apparatus comprising:
    code conversion means having a plurality of input terminals for receiving signals representative of said binary coded constant and a predetermined number of output terminals, said code conversion means being operative in response to said binary coded signals to produce output signals coded in a predetermined manner;
    selection means coupled to only certain ones of said predetermined number of said output terminals; and,
    check circuit means including a predetermined number of input terminals coupled to said selection means for receiving coded signals from said only certain ones of said predetermined number of output terminals, said check circuit means being operative to generate a check signal in response to said coded signals applied to said input terminals for signaling that said constant is valid and the error free operation of said code conversion means.

2. The error detection apparatus of claim 1 wherein said code conversion means includes binary to decimal decoder means operative to produce coded signals having a predetermined number of binary ONES on said predetermined number of output terminals.

3. The error detection apparatus of claim 2 wherein said binary to decimal decoder means consists of a pair of binary to decimal decoder circuits, each having said plurality of input terminals for receiving signals representative of said binary coded constant and each operative to generate said coded signals for binary coded constants having different numerical values.

4. The error detection apparatus of claim 3 wherein one of said pairs of binary to decimal decoder circuits is operative to generate output signals on one half of said predetermined number of output terminals in response to binary values of zero through seven and the other one of said pairs is operative to generate output signals on the remaining half of said predetermined number of output terminals in response to values of eight through fifteen.

5. The error detection apparatus of claim 1 wherein said certain ones of said predetermined number of output terminals correspond to those output terminals having signals representing only those decoded binary coded constants assigned numerical values being checked by said apparatus.

6. The error detection apparatus of claim 5 wherein the number of said only certain ones of said predetermined number of output terminals applied to said check circuit means is less than one half said predetermined number of output terminals.

7. The error detection apparatus of claim 6 wherein said check circuit means includes an odd-even check circuit having odd and even output terminals, said check circuit being operative to generate a check signal indicating when said coded signals applied to said input terminals contain odd and even number of binary ONES.

8. The error detection apparatus of claim 7 wherein said predetermined number of said input is even and said odd-even check circuit is operative to produce an output signal at said odd output terminal and even output terminal respectively for signaling when said constant applied to said apparatus is valid and not valid.

9. The error detection apparatus of claim 7 wherein said predetermined number of inputs is odd and said odd-even check circuit is operative to produce an output signal at said even output terminal and odd terminals respectively for signaling when said constant applied to said apparatus is valid and not valid.

10. The error detection apparatus of claim 7 further including a bistable switching circuit coupled to a predetermined one of said output terminals, said bistable switching circuit being operative in response to an output signal to switch from a first to a second state indicative of an error condition.

11. Error detection apparatus for use in a peripheral controller which controls a plurality of magnetic tape devices for checking speed constants specifying a plurality of different tape velocities, said error detection apparatus comprising:
 a register coupled to receive a speed constant coded to designate a specified one of said plurality of different tape velocities;
 decoder means having n input terminals and at least $2^n$ output terminals, said n input terminals being connected to said register for receiving signals representative of said speed constant;
 circuit selection means having a predetermined number of input terminals and ouptut terminals, said input terminals being connected only to those output terminals producing predetermined signals indicative of having decoded a valid speed constant; and,
 check logic circuit means having at least one output terminal and a plurality of input terminals connected to said predetermined number of output terminals, said logic circuit means being operative to generate an output signal at said output terminal indicative of a valid code and no faults in said decoder circuit and inhibits generation of said output signal when said decoder generates none and more than one predetermined output signal on said $2^n$ output terminals indicative of decoding an invalid speed code.

12. The detection apparatus of claim 11 wherein said circuit selection means consists of a predetermined number of conductors for connecting a corresponding number of said $2^n$ output terminals to said input terminals of said check logic circuit means.

13. The detection apparatus of claim 11 wherein said predetermined number is less than $2^n/2$ of said output terminals.

14. The detection apparatus of claim 13 wherein the number of said less than $2^n/2$ of said output terminals is odd and said output terminal corresponds to an even parity output terminal, said check circuit means being operative to produce said output signal at said even parity output when said decoder circuit means generates only one predetermined output signal on said $2^n$ output terminals in response to said speed constant to signal said controller that constant represents a value speed selection.

15. The detection apparatus of claim 13 wherein the number of said less than $2^n/2$ of said output terminals is even and said output terminal corresponds to an odd parity output, said check circuit means being operative to produce said output signal at said odd parity output terminal when said decoder circuit means generates only one predetermined output signal at said odd parity output terminal when said decoder means generates only one predetermined output signal at said $2^n$ output terminals in response to said speed constant to signal said controller that said constant represents a valid speed selection.

16. The detection apparatus of claim 15 wherein n is a number having a numerical value of 4.

17. The detection apparatus of claim 15 wherein said predetermined output signal corresponds to a binary ZERO signal.

18. The detection apparatus of claim 15 wherein said decoder means includes a pair of binary to decimal decoder circuits, each operative to provide signals at $2^n/2$ output terminals.

19. The detection apparatus of claim 18 wherein each of said binary decoder circuits are connected to receive two different groups of signals representative of said speed constant, one of said groups corresponding to binary codes having values zero through seven and the other group corresponding to binary codes having values 8 through 15.

20. An error detector circuit for signaling receipt of valid binary coded signals, said detector circuit comprising:
 a binary to non binary decoder circuit means having $n$ input terminals and $2^n$ output terminals;
 a predetermined number of conductors connected at one end to less than $2^n$ output terminals; and,
 a parity check circuit having a predetermined number of input terminals connected to the other end of said predetermined number of conductors, said parity circuit being operative to generate an output signal only when said binary to non binary decoder circuit forces only one of said predetermined number of conductors to a predetermined state indicating that said binary code is valid and that said decoder circuit is operating without fault.

* * * * *

UNITED STATES PATENT OFFICE
CERTIFICATE OF CORRECTION

PATENT NO. : 3,938,084
DATED : February 10, 1976
INVENTOR(S) : George J. Barlow

It is certified that error appears in the above-identified patent and that said Letters Patent are hereby corrected as shown below:

Claim 11, line 54, delete "and" and insert --to--.

Claim 11, line 54, delete "inhibits" and insert --inhibit--.

Claim 14, line 14, after "that" insert --said--.

Claim 20, line 57, after "circuit" insert --means--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*